June 2, 1925.

J. E. CARROLL

VALVE ATTACHMENT

Filed Oct. 9, 1922

1,540,512

INVENTOR.
John E. Carroll
By W. W. Williamson
Atty.

Patented June 2, 1925.

1,540,512

UNITED STATES PATENT OFFICE.

JOHN E. CARROLL, OF PHILADELPHIA, PENNSYLVANIA, ASSIGNOR TO C. O-2 PRODUCTS COMPANY, OF PHILADELPHIA, PENNSYLVANIA.

VALVE ATTACHMENT.

Application filed October 9, 1922. Serial No. 593,480.

*To all whom it may concern:*

Be it known that I, JOHN E. CARROLL, a citizen of the United States, residing at Philadelphia, in the county of Philadelphia and State of Pennsylvania, have invented new and useful Improvements in a Valve Attachment, of which the following is a specification.

My invention relates to new and useful improvements in a valve attachment, and has for its primary object to provide such a device that may be readily and quickly placed upon or removed from a valve, such as, for instance, a tire valve and includes means for connection with some object such as an air pump or other tire inflating device so located as to be readily accessible when the device is attached to a valve which is practically inaccessible.

Another object of the invention is to provide a structure of this character having a chamber for registration with the reduced externally threaded end of the valve and having means coacting with one of the "flats" of the valve stem to prevent rotation of the attachment when in place.

Another object of the invention is to provide a screw having sliding engagement with the body of the attachment and threaded engagement with the inner threaded portion of the valve stem to hold the attachment in place, said screw having a passageway through its inner end for ingress of a substance or gas such as air to the valve.

A further object of the invention is to provide a valve attachment which might be termed a "goose neck" having means for temporary connection with the outer end of a valve and further provided with an outwardly projecting tubular arm for connection with an object such as a tire inflating device, said arm being so positioned as to extend some distance from the valve in order that easy access may be had to said arm.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Figure 1:
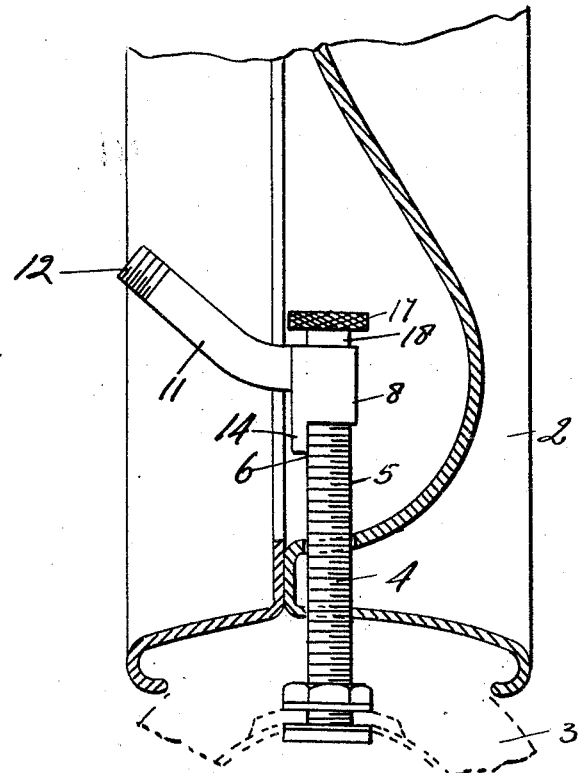
Fig. 1, is a fragmentary sectional view of an automobile wheel and tire showing my improvement attached to a tire valve.
Figure 2:
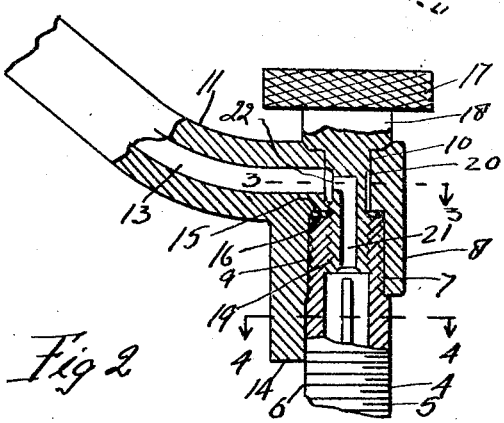
Fig. 2, is an enlarged fragmentary sectional side elevation of the tire valve and the attachment thereon.
Figure 3:
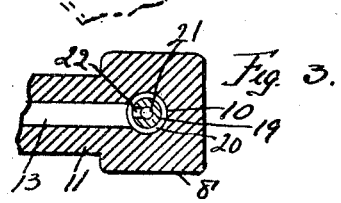
Fig. 3, is a section at the line 3—3 of Fig. 2.
Figure 4:
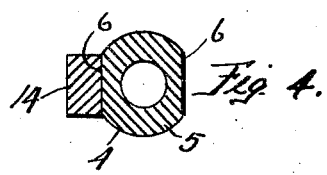
Fig. 4, is a section at the line 4—4 of Fig. 2.

In carrying out my invention as here embodied, 2 represents an automobile wheel here shown as one of the disk type because of the peculiar adaptability of the attachment to wheels of this class and 3 is a tire carrying the tire valve 4.

The tire valve includes a stem 5 which is externally threaded and has two oppositely disposed "flats" or unthreaded flat faces 6 as well as a reduced outer end 7 internally and externally threaded.

The valve attachment includes a body 8 having a longitudinal bore therethrough of two different diameters to form a chamber 9, for registration with the reduced outer end of the valve, and a communicating screw receiving hole 10 and both the recess and hole are unthreaded or smooth bored. Projecting laterally from one side of the body is a tubular arm 11 having an externally threaded outer end as indicated at 12 and the passageway 13 through this arm communicates with the bore and more particularly with the screw receiving hole 10 in the body 8.

A lip 14 depends from one side only of the body 8 and is adapted to engage one of the flat faces 6 of the valve when the body is placed over the outer end of said valve with said reduced end in the recess 9. The difference between the diameters of the recess 9 and the hole 10 produces a shoulder 15 which is adapted to engage the extreme outer end of the valve and if found desirable a suitable packing or gasket 16 may be interposed between said shoulder and the end of the valve.

A screw 17 consisting of a head 18 and a stem 19, threaded adjacent its inner end only, passes through the hole 10 for threaded engagement with the internal threads of the valve so that when the head of said screw engages the outer end of the body the latter will be drawn firmly down upon the end of the valve and there held in place. This screw has a circumferential groove 20 formed to the rear of the threaded portion or between said threaded portion and the screw head so that when the parts are properly positioned said groove will lie in the same plane as or align with the inner end of the passageway 13 in order to communicate with said passageway, while a bore 21 is formed in the stem of the screw from its inner end to a point in the region of the groove 20 where it has an inlet 22 from the side of the screw thereby forming a communication between the groove 20 and the bore 21.

From the foregoing description it will be seen that the body of the attachment may be readily and quickly placed over the reduced outer end of the valve without any screwing operations, after which the screw 17 is placed in the hole 10 which will guide said screw to the internally threaded portion of the valve at which time said screw may be revolved until the head thereof engages the outer end of the body 8 to firmly attach said body temporarily to the tire valve. When this has been done the groove 20 will be in alignment with the passageway 13 so that a communication is formed between the arm 11 and the interior of the tire valve. At the same time the lip 14 will project a sufficient distance to engage one of the flat faces 6 and thereby prevent rotation of the body during placement of the screw.

When the parts are in position as herein described and as shown in Fig. 1, the outer threaded end of the arm 11 is some distance from the valve and is therefore away from the ordinary obstructions, such as the parts of a wheel adjacent its tire valve, so that an air pump or other tire inflating device may be readily connected to the arm of the attachment.

Of course I do not wish to be limited to the exact details of construction as herein shown as these may be varied within the limits of the appended claims without departing from the spirit of my invention.

Having thus fully described my invention, what I claim as new and useful is:—

1. The combination with a tire valve having an external flat face and an internal thread, of an attachment for connection to said tire valve, said attachment comprising a body having a recess registering with the outer end of the tire valve, and a lip projecting from the body and engaging the flat face of the tire valve for the purpose specified.

2. A valve attachment comprising a body adapted to be placed over the outer end of a valve, a tubular arm projecting laterally from one side of said body, a screw passing through said body for threaded connection with the valve, said screw having means to form a communication between the tubular arm and the interior of the valve, and means projecting from the body for coaction with a portion of the valve to prevent rotation of said body relative to said valve.

3. The herein described combination with a valve having a flat face and a reduced outer end internally threaded, of a body having a recess for registration with the reduced outer end of the valve, and a hole of smaller diameter than said recess projecting from the latter in endwise alignment therewith, the difference in diameters of said recess and hole producing a shoulder for engagement with the extreme outer end of the valve, a lip projecting from the inner end of the body at one side for engagement with the flat face of the valve to prevent rotation of the body relative to said valve, an arm projecting laterally from one side of the body and having a passageway therethrough in communication with the hole through the body, said arm having means for connection to a device, ordinarily connected directly to the valve and means passing through the hole in the body for temporary securement of said body to the valve, said means forming a communication between the passageway through the arm and the interior of the valve.

4. The herein described combination with a valve having a flat face and a reduced outer end internally threaded, of a body having a recess for registration with the reduced outer end of the valve, and a hole of smaller diameter than said recess projecting from the latter in endwise alignment therewith, the difference in diameters of said recess and hole producing a shoulder for engagement with the extreme outer end of the valve, a lip projecting from the inner end of the body at one side for engagement with the flat face of the valve to prevent rotation of the body relative to said valve, an arm projecting laterally from one side of the body and having a passageway therethrough in communication with the hole through the body, said arm having means for connection with a device that is ordinarily connected directly with the valve, and a screw consisting of a head and stem adapted to be inserted in the hole in the body with the head in engagement with the outer end of said body, said stem being threaded at its inner end for engagement with the internally threaded portion of the valve and provided with a circumferential groove to the rear of said threads for alignment with the inner end of the passageway through the arm and further provided with a bore from its inner end to a point in the region of the groove where an inlet from one side of the stem forms a communication between the groove and bore.

5. A valve attachment comprising in combination, a valve having an internally threaded outer end and an external flat face, a body having a bore therethrough for registration with the outer end of the valve, means projecting from said body for engagement with the flat face of the valve to prevent rotation of said body relative to said valve, tubular means projecting laterally from the body and communicating with the bore of said body, said means adapted for connection with a device operating on the valve and a screw sliding through the body and having threaded engagement with the outer end of the valve for temporarily connecting the body with said valve, said screw having a passageway leading from one side thereof in the region of the inner end of the tubular means to the inner end of the screw for forming a communication between said tubular means and the interior of the valve.

In testimony whereof, I have hereunto affixed my signature.

JOHN E. CARROLL.